US011796506B2

(12) United States Patent
Seavey (10) Patent No.: US 11,796,506 B2
(45) Date of Patent: Oct. 24, 2023

(54) ROBOTIC MAGNETIC FLUX LEAKAGE INSPECTION SYSTEM FOR CABLE STAYS AND RELATED METHODS

(71) Applicant: IPC TFIC, LLC, Yarmouth, ME (US)

(72) Inventor: William Seavey, Clearwater, FL (US)

(73) Assignee: IPC TFIC, LLC, Yarmouth, ME (US)

( * ) Notice: Subject to any disclaimer, the term of this patent is extended or adjusted under 35 U.S.C. 154(b) by 0 days.

(21) Appl. No.: 16/786,431

(22) Filed: Feb. 10, 2020

(65) Prior Publication Data

US 2020/0256832 A1 Aug. 13, 2020

Related U.S. Application Data

(60) Provisional application No. 62/803,140, filed on Feb. 8, 2019.

(51) Int. Cl.
*G01N 27/82* (2006.01)
*G05D 1/00* (2006.01)

(52) U.S. Cl.
CPC ........... *G01N 27/82* (2013.01); *G05D 1/0094* (2013.01)

(58) Field of Classification Search
CPC .............................. G01N 27/82; G05D 1/0094
See application file for complete search history.

(56) References Cited

U.S. PATENT DOCUMENTS

| | | | |
|---|---|---|---|
| 4,468,619 A | 8/1984 | Reeves | |
| 4,659,991 A | 4/1987 | Weischedel | |
| 5,321,356 A | 6/1994 | Weischedel | |
| 5,581,037 A | 12/1996 | Kwun et al. | |
| 5,821,749 A | 10/1998 | Booker | |
| 6,633,159 B1 | 10/2003 | Robar et al. | |
| 8,844,387 B1 | 9/2014 | Tunacik, Jr. et al. | |
| 9,535,026 B2 | 1/2017 | Marashdeh et al. | |
| 2010/0148766 A1* | 6/2010 | Weischedel | G01N 27/9006 324/238 |
| 2014/0116715 A1 | 5/2014 | Sipila et al. | |
| 2014/0368191 A1 | 12/2014 | Goroshevskiy et al. | |
| 2016/0025680 A1 | 1/2016 | Schein, Jr. | |
| 2017/0160236 A1* | 6/2017 | Uhlig | G01N 27/87 |
| 2019/0178844 A1* | 6/2019 | Lott | G01R 33/0094 |

FOREIGN PATENT DOCUMENTS

| | | |
|---|---|---|
| EP | 266103 | 5/1994 |
| EP | 2450700 | 5/2012 |
| WO | WO2011058369 | 5/2011 |

OTHER PUBLICATIONS

JP-2013-245496A English Machine Translation, retrieved from Espacenet (Year: 2013).*

* cited by examiner

*Primary Examiner* — Minh Q Phan
(74) *Attorney, Agent, or Firm* — Finnegan, Henderson, Farabow, Garrett & Dunner, LLP (57) ABSTRACT

A robotic inspection system to detect discontinuities within bridge cable stays includes a sensing device configured to move along an outer surface of a cable stay to detect magnetic flux leakage within the cable stay, and a transport vehicle is coupled to the sensing device and configured to determine the location of the sensing device on the cable stay. In addition, the system includes a control station configured to wirelessly interface with the sensing device and the transport vehicle, where the control station is configured to generate a cable stay condition assessment report from the detection of the magnetic flux leakage to identify locations and sizes of the discontinuities within the cable stays.

13 Claims, 8 Drawing Sheets

ROBOTIC MAGNETIC FLUX LEAKAGE INSPECTION SYSTEM FOR CABLE STAYS AND RELATED METHODS

RELATED APPLICATIONS

The present invention is related to U.S. Provisional Patent Application Ser. No. 62/803,140 filed Feb. 8, 2019, the entire contents of which are incorporated herein by reference.

TECHNICAL FIELD

The present invention relates to the field of bridge inspection devices, and, more particularly, to a robotic magnetic flux leakage inspection system for cable stays and related methods.

BACKGROUND

The corrosion of bridge cable stays is a serious problem that can compromise the structural integrity of a bridge with minimal visual signs. Consequently, the early detection of deficiencies of the bridge cable stays is a major safety issue. Without detection, steel corrosion can occur to the point of collapse without any major outward visual signs.

One existing method of inspection involves a person in a bucket truck or a person climbing up the cable stay and visually inspecting it. While this is slow and tedious, it also can lead to missed flaws and is dangerous to the inspector. Visual inspection from the ground by binoculars or telescope can also have the limitation of the angle and not being able to view the top or opposite side of the cable.

According a need exists for a system to inspect cables stays and the anchor pier connections completely and inexpensively that can be used on multiple types of bridges and cable stays, that is easy to transport between bridges and cables stays, and can provide complete inspection coverage of the cable stays and the cable stay anchor pier connections.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY

In a particular embodiment, a robotic inspection system to detect discontinuities within bridge cable stays is disclosed. The system includes a sensing device configured to move along an outer surface of a cable stay to detect magnetic flux leakage within the cable stay, and a transport vehicle is coupled to the sensing device and configured to determine the location of the sensing device on the cable stay. In addition, the system includes a control station configured to wirelessly interface with the sensing device and the transport vehicle, where the control station is configured to generate a cable stay condition assessment report from the detection of the magnetic flux leakage to identify locations and sizes of the discontinuities within the cable stays.

In another aspect, a method of detecting discontinuities within a bridge cable stay is disclosed. The method includes moving a sensing device along an outer surface of a cable stay using a transport vehicle coupled to the moving device, and detecting magnetic flux leakage within the cable stay. The sensing device includes a sensor array having an inductive coil sensor configured to detect the magnetic flux leakage to indicate a discontinuity within the cable stay, and a plurality of sets of rare-earth magnets grouped in measurement channels, wherein each of which delivers a cross-sectional magnetic field.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
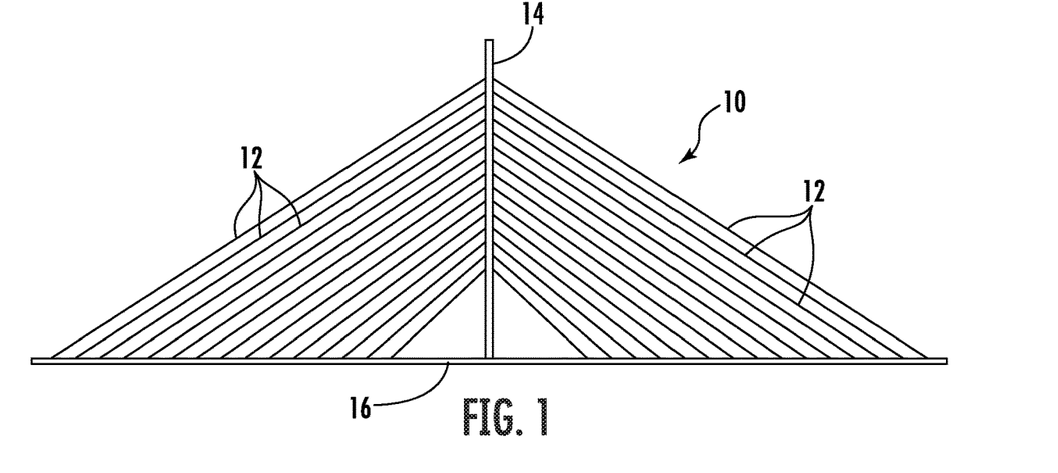
FIG. 1 is an elevational view of a bridge having cable stays for support.
Figure 2:
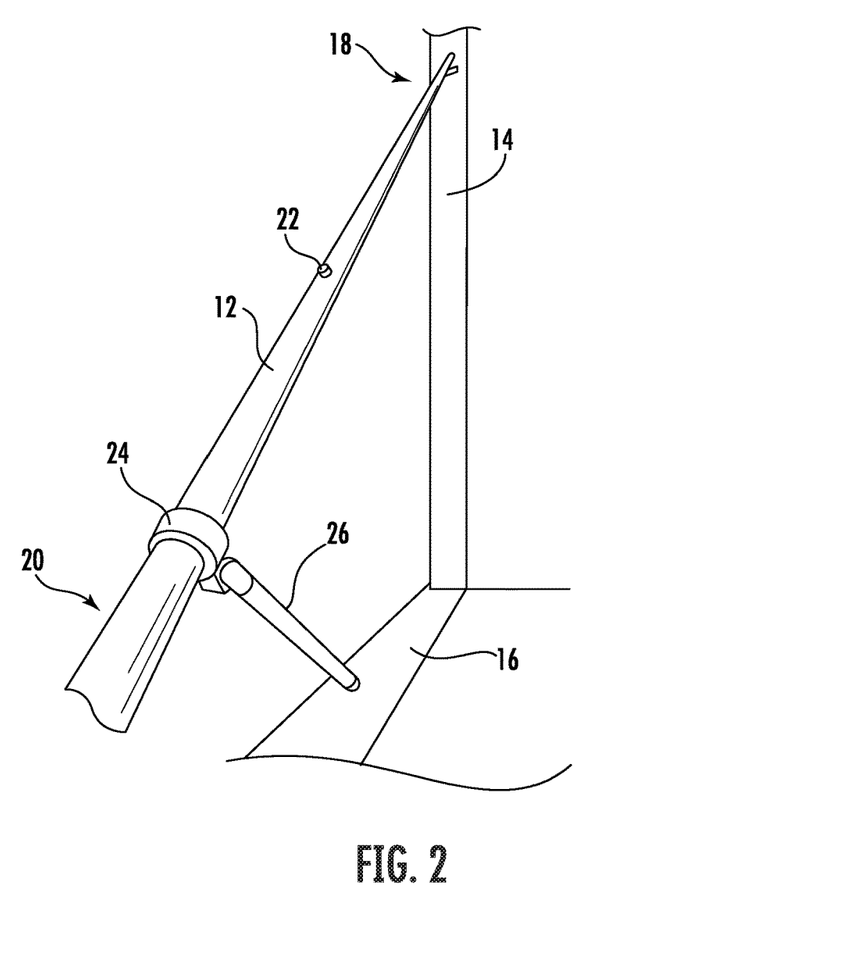
FIG. 2 is a partial detail view of a cable stay shown in FIG. 1.

Referring now to FIGS. 1 and 2, a cable stay bridge structure 10 is shown for reference. In particular, cable stays 12 are connected between a pier 14 and a superstructure 16. The superstructure 16 is used to support the bridge deck. The cable stays 12 each have an upper portion 18 that connects to the pier 14 and a lower portion 20 that connects to the superstructure 16.

The cable stays 12 are hollow tubular members with steel cables and are filled with grout using grout ports 22 that are dispersed along a length of each of the cable stays 12. The grout ports 22 protrude outward from the cable stays 12. In addition, there are band couplers 24 that are used to connect struts 26 between the cable stays 12 and the superstructure 16.

The robotic inspection system utilizes a non-destructive testing (NDT) method to locate and assess the condition of bridge cable stays 12. In particular, cross-sectional damage can occur within the cable stays 12 due to corrosion and fracture, which can lead to stress concentrations. Cross-sectional damage can be a direct cause of structural failure. Therefore, nondestructive evaluation (NDE) is necessary to detect the initial stages of cross sectional damage in a cable stay 12. However, it is difficult to monitor the condition of most cable stays 12, as the damage can be invisible and inaccessibly located. Accordingly, the present invention utilizes a magnetic flux leakage (MFL) method to detect discontinuities.

The MFL method includes magnetizing the cable stays 12. The cable stay 12 that is magnetized has a magnetic field in and around itself. The magnetic field spreads out when it encounters a small air gap created by a discontinuity and it appears to leak out of the cable stay 12. A strong permanent magnet or an electromagnet is used to establish a magnetic flux in the cable stay 12 to be inspected. When there is no defect, the flux in the metal remains uniform. However, when there is a discontinuity the flux leaks out of the metal near the discontinuity. A sensor array described below in more detail is configured to detect this flux leakage and to generate an electric signal that is proportional to the magnetic flux leakage. A control station 130 may be configured to wirelessly interface with the sensing device 100 and the transport vehicle 200, where the control station 130 is configured to generate a cable stay condition assessment report from the detection of the magnetic flux leakage to identify locations and sizes of the discontinuities within the cable stays 12.

Figure 3:
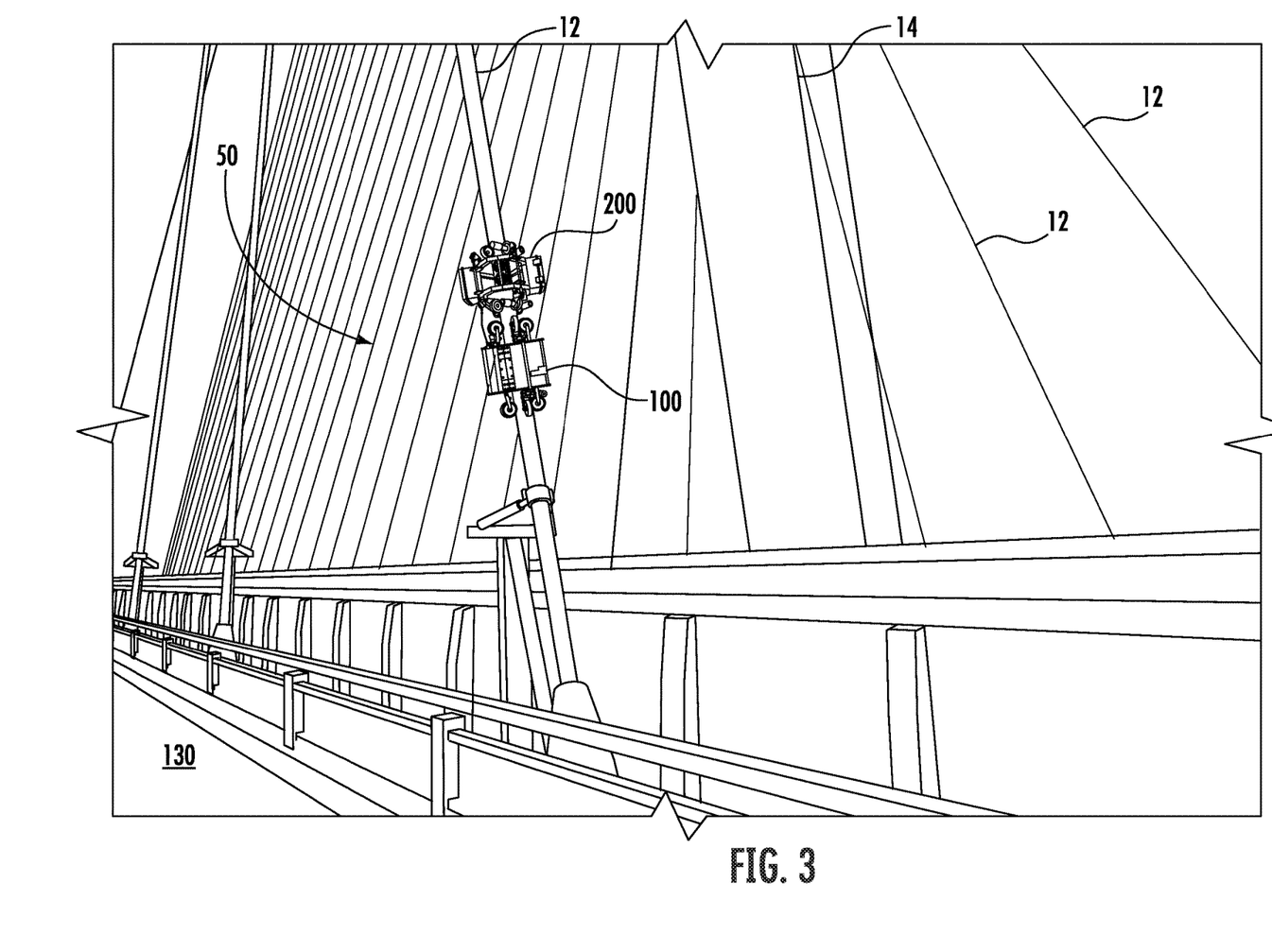
FIG. 3 is a perspective view of a robotic inspection system secured to a cable stay in accordance with the invention.

The system 50 is shown in FIG. 3 secured around the cable stay 12 and performing an inspection. The system 50 includes the sensing device 100 and the transport vehicle 200, which may be wireless and battery operated. In a particular embodiment, the sensing device 100 is coupled completely around (360 degrees) a cable stay 110 and travels along the cable stay 12 performing an inspection of the condition of the cable stay 12.

Figure 4:
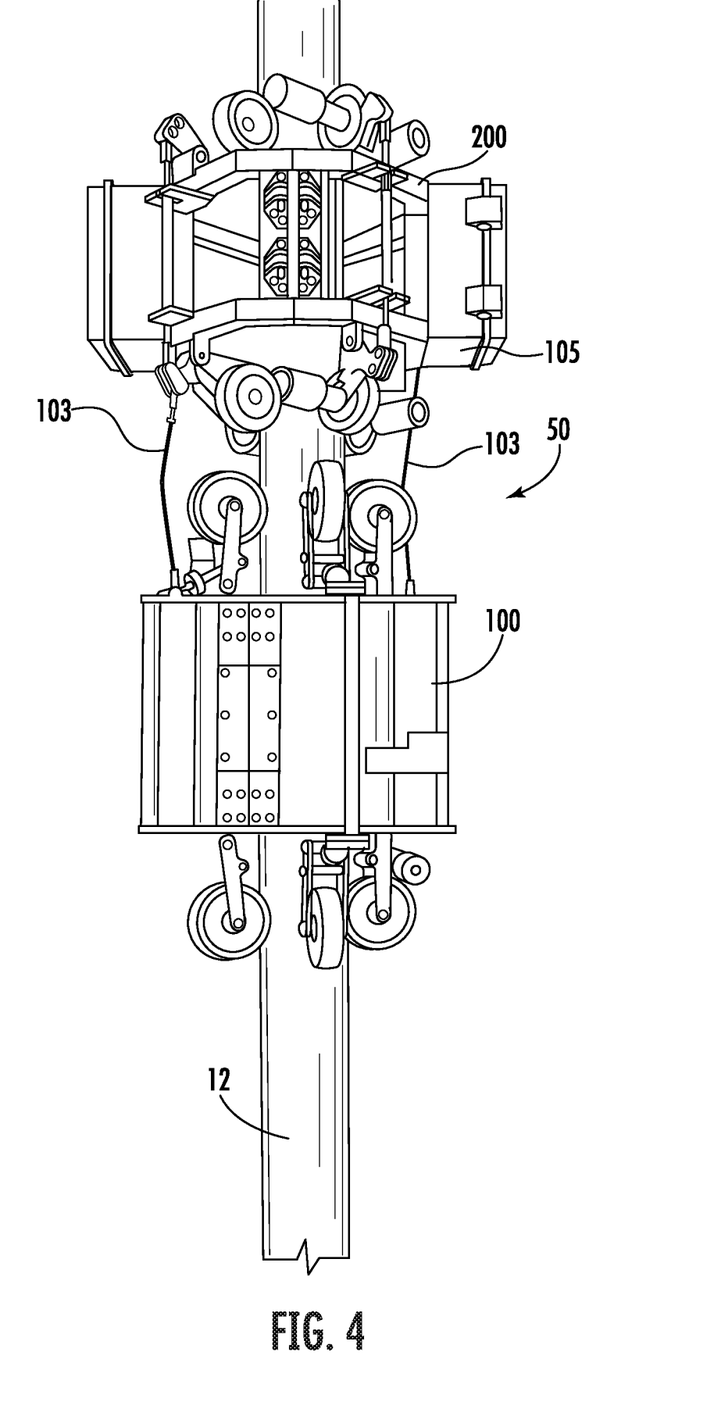
FIG. 4 is an elevational view of the robotic inspection system.

The sensing device 100 is coupled to the transport vehicle 200 that pulls and pushes the sensor 100 along the cable stay 12, and operates on battery power with wireless connectivity to a control station 130. The sensor 100 and the transport vehicle 200 may be coupled together with connecting rods 103 as shown in FIG. 4, for example. The inspections of the cable stays 12 are in real-time with minimum back office processing.

In a particular illustrative embodiment, the sensing device 100 uses the magnetic flux leakage (MFL) method described above to generate a visual indicator of the condition of the cable stay 12.

For example, the visual indicator may be a two dimensional graph that indicates where the discontinuity within the cable stay 12 is located and to what degree as described in more detail with reference to FIG. 9 below. The sensing device 100 takes multiple measurements of the magnetic field at the periphery of the respective cable stay 12 and combines these measurements to provide information of the magnetic properties of the process volume to indicate the extent of loss of magnetic area. This correlates to the amount of steel within the cable stay 12 that may be damaged.

Figure 5:
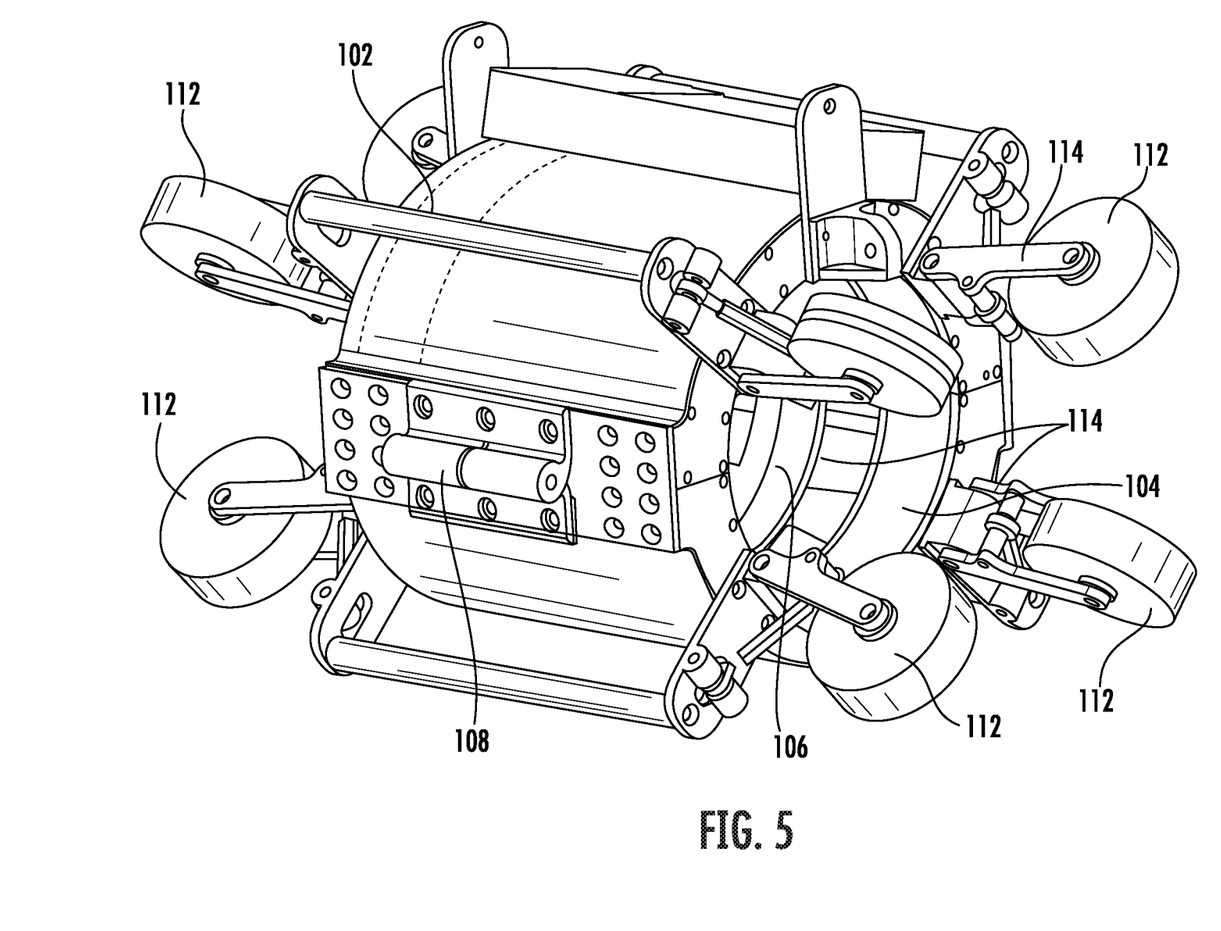
FIG. 5 is a perspective view of a sensing device of the robotic inspection system in a closed position.
Figure 6:
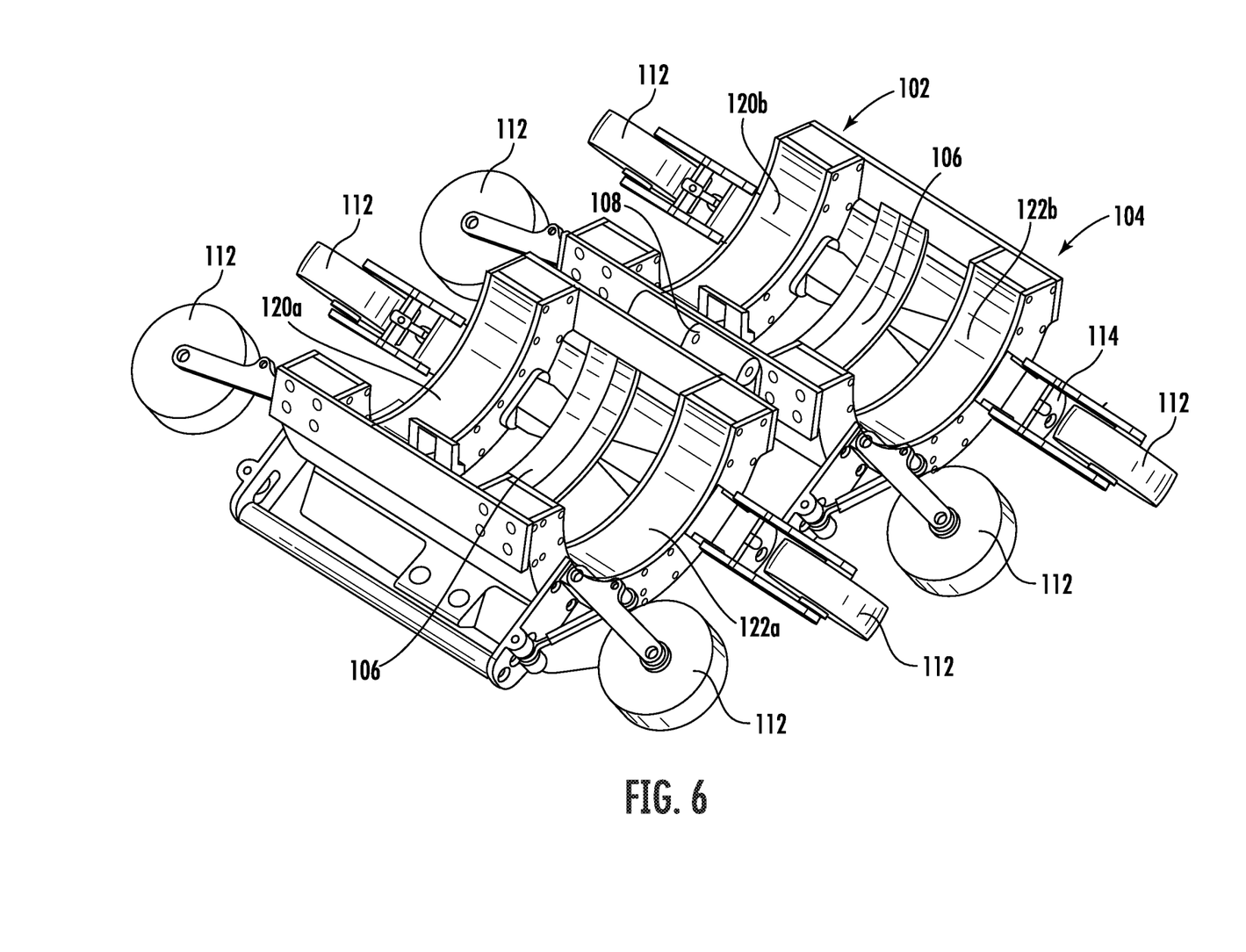
FIG. 6 is a perspective view of the sensing device in an open position.

Referring now to FIGS. 5 and 6, the sensing device 100 includes a first magnet 102 having a first polarity and a second magnet 104 having a second polarity. The first and second magnets 102, 104 may comprise sets of rare-earth magnets grouped in measurement channels, where each of which delivers a cross-sectional magnetic field. The sensing device 100 may also includes a sensor array 106 and processor 105 that is configured to analyze raw voltage measurements from the sensor array 106 using algorithms and provide analysis and export of graphical data. The sensor array 106 is configured to detect the magnetic flux leakage perpendicular to a surface of the cable stay 12. The sensor array 106 may include an inductive coil sensor or Hall effect sensor configured to detect the magnetic flux leakage to indicate a discontinuity within the cable stay 12.

In particular, the sensor array 106 mounting and location is one of the key elements to the accuracy of the system 50. The sensor array 106 may comprise a three-hundred wound inductive coil with twelve Hall effect sensors within the coil. A problem the industry has is a 5% break on the outer edge of the cable stay 12 bundle is a 2% loss on the inside. The sensor 100 uses the Hall effect sensors to triangulate the location and then applies an algorithm that takes into consideration the depth when calculating the % of loss. The result is that the system 50 brings it back to 5%.

As shown in FIG. 6, the first magnet 102 comprises two halves 120*a*, 120*b*, that are hingedly coupled to each other by clasp 108. Similarly, the second magnet 104 comprises two halves 122*a*, 122*b* that are hingedly coupled to each other by clasp 108. Accordingly, the first and second magnets 102, 104 can be swung apart so that the sensing device 100 can be secured completely around the cable stay 12.

Once the sensing device 100 is secured to the cable stay 12, the wheels 112 can be adjusted using respective wheel clamps 114 so that the sensing device 100 can be pushed and pulled along the cable stay 12 using the transport vehicle 200 and passing adjacent within a few inches of the exterior surface of the cable stay 110.

Figure 7:
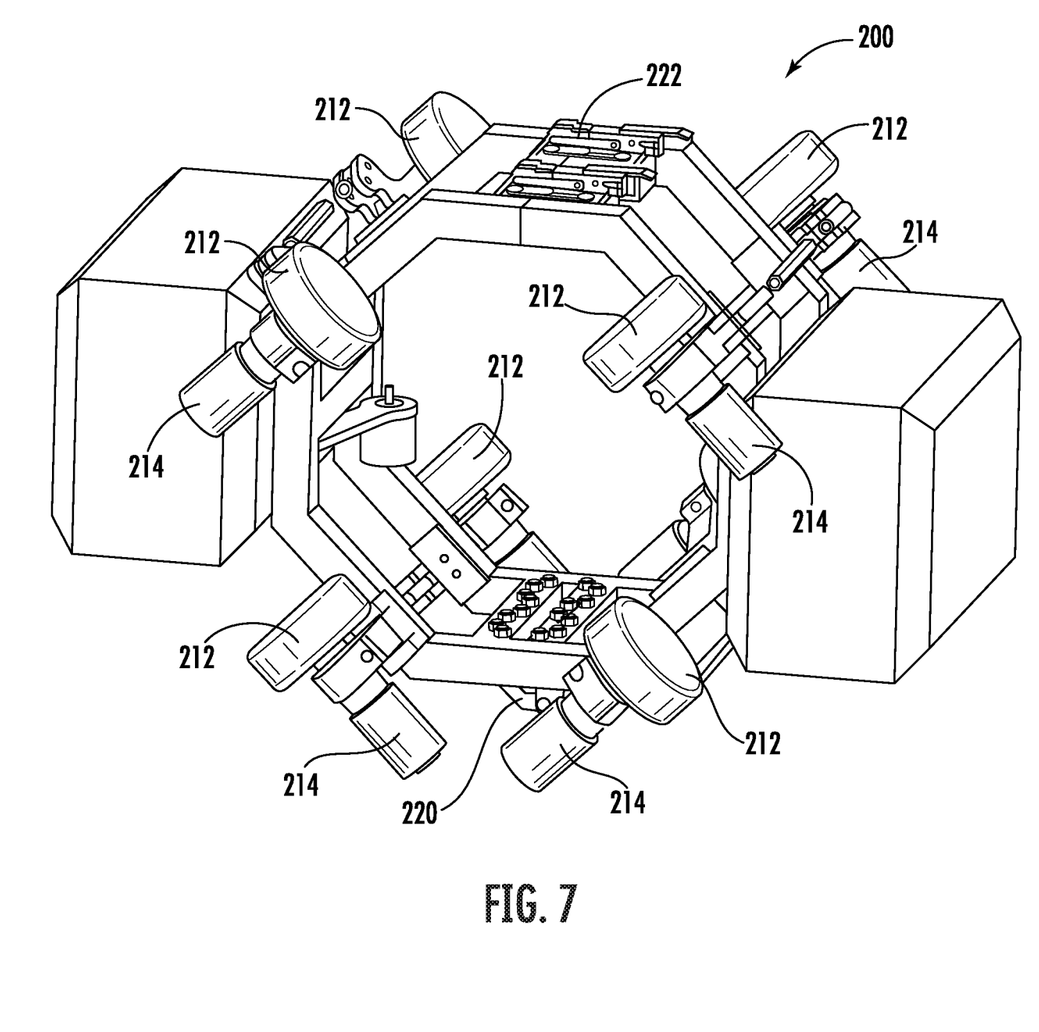
FIG. 7 is a perspective view of a transport vehicle of the robotic inspection system in a closed position.

Referring now to FIG. 7, a perspective schematic view of the transport vehicle 200 is shown. The transport vehicle 200 is a comprehensive maneuverable inspection device that can travel up, down and around the cable stays 12. The transport vehicle 200 is configured to push and pull the sensor 100 along the cable stay 12. The transport vehicle 200 may include wireless communications equipment in order to receive command and control commands and also to wirelessly transmit video.

The transport vehicle 200 is configured to mount to a selected cable stay 12 and travel the length of the cable stay 12 while being fully controlled and monitored remotely. The wheels 212 for the vehicle transport 200 may comprise rubber adapted for gripping the cable stay 12 and for mobility. The transport vehicle 200 is able to transverse the cable stay 12 up and down from the lower portion 20 to the upper portion 18 of the cable stay 12 by the rotation of the wheels 212.

As described below, electric motors 214 that drive the wheels 212 for the transport vehicle 200 may each include a pulse encoder that generates a pulse for each distance of rotation of the respective wheel 212. For example, the electric motor 214 may generate a pulse for clockwise rotation that is different from counter-clockwise rotation. The pulses indicate a set distance traveled in order to calculate how far the transport vehicle 200 has traveled in a direction up the cable stay 12.

The transport vehicle 200 is configured to gradually accelerate and decelerate in order to not spin the wheels 212. The angle that the cable stay 12 is mounted is a given parameter that can be used with the pulse signals in calculating the reference location of the transport vehicle 200 on the cable stay 12 at any given moment in time. Subsequently, it can be calculated how far the transport vehicle 200 has traveled for documenting any flaw or point of interest on the cable stay 12. In addition, where that flaw or point of interest is located is important for a maintenance vehicle to be able to park under that location for repair or further inspection using a bucket truck, for example. Accordingly, the location of the flaw or point of interest relative to the ground surface can be calculated based on the angle of the cable stay 12 and distance of the flaw along the cable stay 12.

Figure 8:
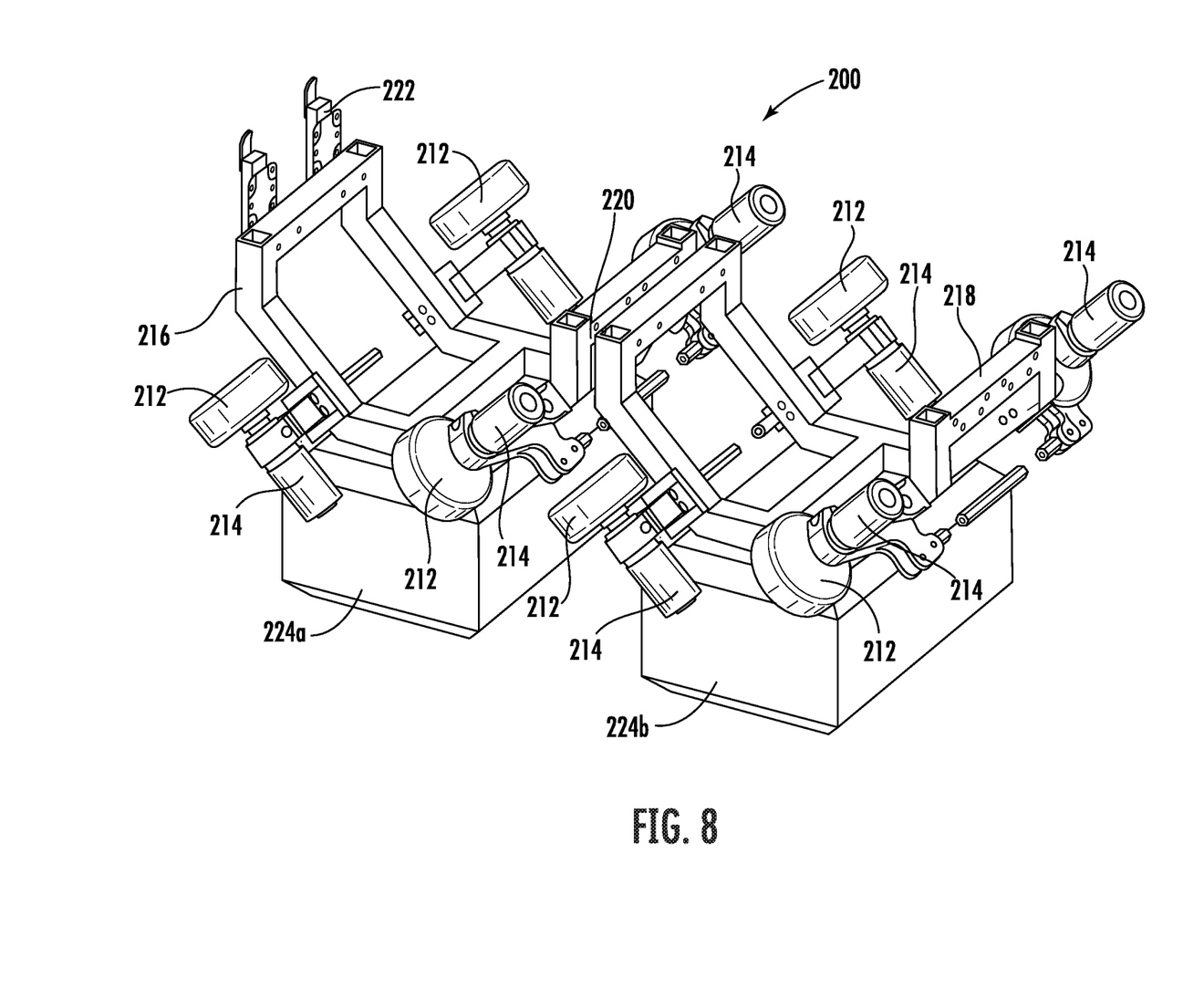
FIG. 8 is a perspective view of the transport vehicle in an open position.

As shown in FIG. 8, the transport vehicle includes a first half 216 and second half 218. The transport vehicle 200 is configured to be secured around a cable stay 12 using the first and second halves 216, 218 that are configured to swing open and closed about a hinge pin 220 in order to secure the transport vehicle 200 around a cable stay 12 using a lockable handle 222.

The transport vehicle may include a power supply 224a, 224b in electrical communication with the respective electric motor 214 to drive the wheels 212. The electric motors 214 are responsive to remote controls.

Figure 9:
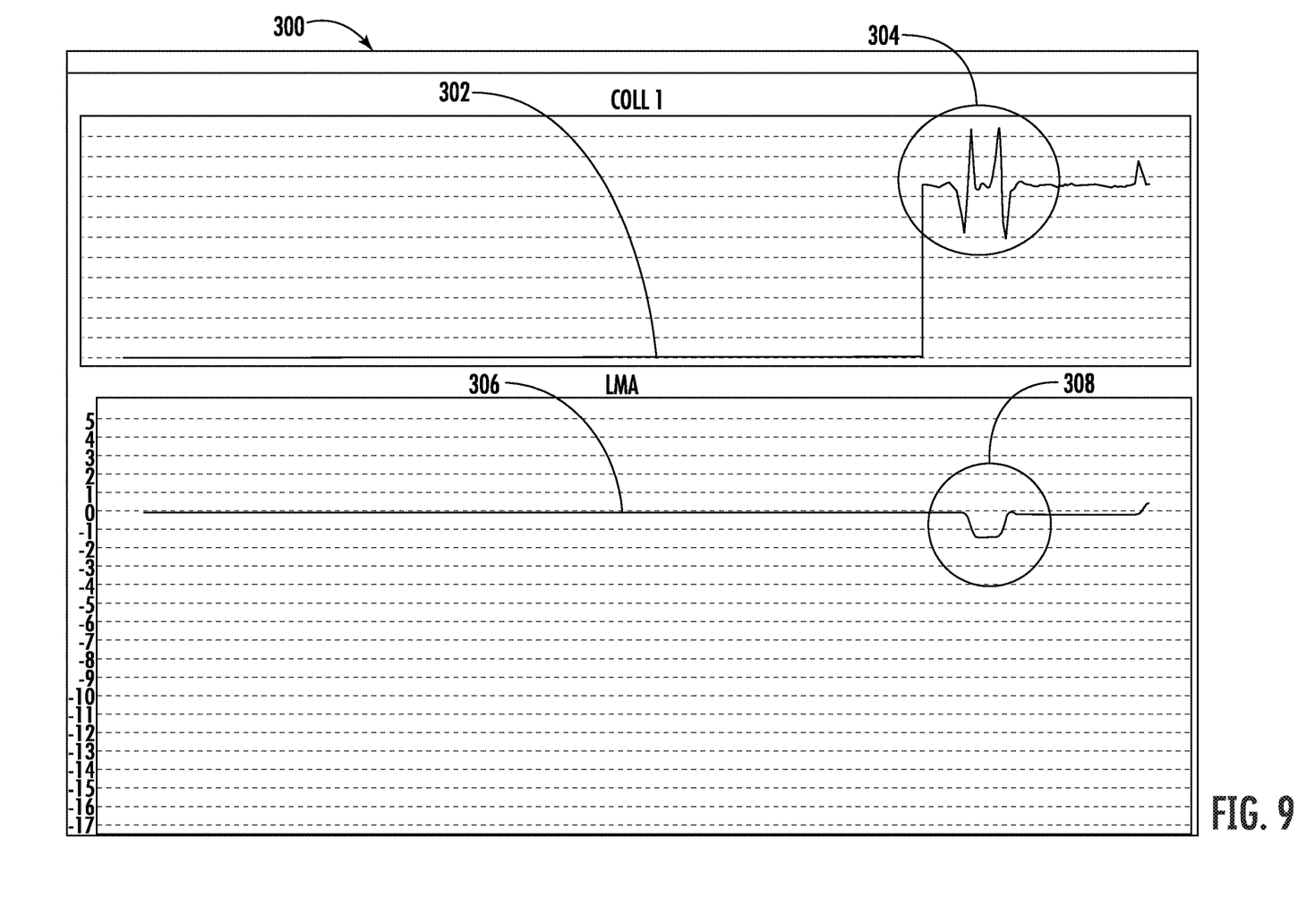
FIG. 9 is an exemplary graph generated by the sensing device.

Referring now to FIG. 9, results of a non-destructive evaluation of a cable stay 12 can be generated in a graph 300 to make it easy to interpret by the inspector. The results are included as part of a condition assessment report that is generated using the inspection results from the sensing device 100 and identifies locations and sizes of these discontinuities. By accurately detecting deficient areas within the cable stays 12, repairs can be made more quickly and can be more efficiently conducted.

For example, the results of measurements from the sensing device 100 (e.g. raw voltage measurements) are plotted along a measurement line 302 and where magnetic flux leakage is detected is shown in portion 304 of the graph 300. A correlating chart reflects loss of magnetic area (LMA) values 306. As can be seen in FIG. 9, portion 308 of the graph 300 indicates a relative loss of magnetic area that should be flagged for further inspection and/or repair.

In another aspect, a method of detecting discontinuities within a bridge cable stay is disclosed. The method includes moving a sensing device along an outer surface of a cable stay using a transport vehicle coupled to the moving device, and detecting magnetic flux leakage within the cable stay. The sensing device includes a sensor array having an inductive coil sensor configured to detect the magnetic flux leakage to indicate a discontinuity within the cable stay, and a plurality of sets of rare-earth magnets grouped in measurement channels, wherein each of which delivers a cross-sectional magnetic field.

The system 50 and methods disclosed herein are designed to overcome the shortcomings of the current techniques and methodologies in the art and assist in the preservation of service life of existing bridges. In particular, the system 50 is configured to pinpoint discontinuities within a cable stay 12, which may indicate need for a repair and helps to manage cable stay maintenance over time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A robotic inspection system to detect discontinuities within a bridge cable stay, the system comprising:
   a sensing device configured to move along an outer surface of a cable stay to detect magnetic flux leakage within the cable stay;
   a plurality of magnets coupled to the sensing device to magnetize the cable stay, wherein the plurality of magnets comprise a first arcuate magnet of a first polarity and a longitudinally spaced apart second arcuate magnet of an opposing second polarity;
   an arcuate sensor array having a first arcuate portion and a second arcuate portion coupled to the sensing device between the first and second arcuate magnets and each of the first and second arcuate portions having a respective inductive coil with a plurality of Hall effect sensors within the respective inductive coil and configured to detect the magnetic flux leakage to indicate a discontinuity within the cable stay;
   a processor coupled to the arcuate sensor array and configured to analyze raw voltage measurements; and
   a transport vehicle coupled to the sensing device configured to push and pull the sensing device along the cable stay.

2. The robotic inspection system of claim 1, wherein the plurality of magnets are grouped in measurement channels, wherein each of which delivers a cross-sectional magnetic field.

3. The robotic inspection system of claim 1, wherein the magnets are configured to magnetize the cable stay along a longitudinal direction.

4. The robotic inspection device of claim 1, wherein the sensor array is configured to detect the magnetic flux leakage perpendicular to a surface of the cable stay.

5. The robotic inspection system of claim 1, wherein the sensing device comprises an annulus shape configured to open to be secured completely around the cable stay.

6. A robotic inspection system to detect discontinuities within a bridge cable stay, the system comprising:
   a sensing device configured to move along an outer surface of a cable stay to detect magnetic flux leakage within the cable stay;
   a plurality of magnets coupled to the sensing device to magnetize the cable stay, wherein the plurality of magnets comprise a first arcuate magnet of a first polarity and a longitudinally spaced apart second arcuate magnet of an opposing second polarity;
   an arcuate sensor array having a first arcuate portion and a second arcuate portion coupled to the sensing device between the first and second arcuate magnets and each of the first and second arcuate portions having a respective inductive coil with a plurality of Hall effect sensors within the respective inductive coil and configured to detect the magnetic flux leakage to indicate a discontinuity within the cable stay;
   a transport vehicle coupled to the sensing device configured to push and pull the sensing device along the cable stay; and
   a control station configured to wirelessly interface with the sensing device and to generate a cable stay condition assessment report from the detection of the magnetic flux leakage to identify locations and sizes of the discontinuities within the cable stay.

7. The robotic inspection system of claim 6, wherein the plurality of magnets are grouped in measurement channels, wherein each of which delivers a cross-sectional magnetic field.

8. The robotic inspection system of claim 6, wherein the sensing device comprises a processor configured to analyze raw voltage measurements.

9. The robotic inspection system of claim 6, wherein the magnets are configured to magnetize the cable stay along a longitudinal direction.

10. The robotic inspection device of claim 6, wherein the sensor array is configured to detect the magnetic flux leakage perpendicular to a surface of the cable stay.

11. The robotic inspection system of claim 6, wherein the sensing device comprises an annulus shape configured to open to be secured completely around the cable stay.

12. A method of detecting discontinuities within a bridge cable stay using a sensing device, the method comprising:
- coupling a plurality of magnets to the sensing device, wherein the plurality of magnets comprises a first arcuate magnet of a first polarity and a longitudinally spaced apart second arcuate magnet of an opposing second polarity;
- moving the sensing device along an outer surface of a cable stay using a transport vehicle coupled to the sensing device, wherein the sensing device comprises an arcuate sensing array having a first arcuate portion and a second arcuate portion coupled between the first and second arcuate magnets and each of the first and second arcuate portions having a respective inductive coil with a plurality of Hall effect sensors within the respective inductive coil and configured to detect the magnetic flux leakage to indicate a discontinuity within the bridge tendon; and
- detecting magnetic flux leakage within the cable stay using the sensing device.

13. The method of claim 12, wherein the plurality of magnets are grouped in measurement channels, wherein each of which delivers a cross-sectional magnetic field.

* * * * *

UNITED STATES PATENT AND TRADEMARK OFFICE
CERTIFICATE OF CORRECTION

| | |
|---|---|
| PATENT NO. | : 11,796,506 B2 |
| APPLICATION NO. | : 16/786431 |
| DATED | : October 24, 2023 |
| INVENTOR(S) | : William Seavey |

It is certified that error appears in the above-identified patent and that said Letters Patent is hereby corrected as shown below:

In the Claims

Claim 2, Column 6, Line 14, "wherein each" should read as --each--.

Claim 7, Column 6, Line 54, "wherein each" should read as --each--.

Claim 13, Column 7, Lines 22-23, "wherein each" should read as --each--.

Signed and Sealed this
Twelfth Day of March, 2024

*Katherine Kelly Vidal*

Katherine Kelly Vidal
*Director of the United States Patent and Trademark Office*